United States Patent
Helbing et al.

(10) Patent No.: US 6,638,882 B1
(45) Date of Patent: Oct. 28, 2003

(54) FIBER GLASS BINDER COMPOSITIONS AND PROCESS THEREFOR

(75) Inventors: Clarence H. Helbing, Shelbyville, IN (US); Brian Lee Swift, Morristown, IN (US)

(73) Assignee: Knauf Fiber Glass GmbH, Shelbyville, IN (US)

( * ) Notice: Subject to any disclaimer, the term of this patent is extended or adjusted under 35 U.S.C. 154(b) by 0 days.

(21) Appl. No.: 09/169,719

(22) Filed: Oct. 9, 1998

Related U.S. Application Data

(60) Provisional application No. 60/085,890, filed on May 18, 1998.

(51) Int. Cl.$^7$ .................. B32B 17/06; C08L 61/10
(52) U.S. Cl. .............. 442/180; 442/331; 524/596; 524/841; 264/109; 264/257; 156/181; 525/504
(58) Field of Search ............................. 442/327, 331, 442/180, 176; 156/181; 264/257, 109; 427/340, 372.2, 389.7; 525/504; 524/596, 841

(56) References Cited

U.S. PATENT DOCUMENTS

| | | | | |
|---|---|---|---|---|
| 3,616,179 A | 10/1971 | McCombs et al. | | 524/595 |
| 3,944,703 A | 3/1976 | Harding | | 442/327 |
| 4,045,398 A | 8/1977 | Dahms | | 524/596 |
| 4,067,829 A | 1/1978 | Garrett | | 521/91 |
| 4,076,873 A | 2/1978 | Shea | | 428/34.5 |
| 4,373,062 A | 2/1983 | Brown | | 524/841 |
| 4,461,859 A | 7/1984 | Girgis | | 524/62 |
| 4,476,191 A | 10/1984 | Girgis | | 428/378 |
| 4,525,492 A | 6/1985 | Rastall et al. | | 521/181 |
| 4,650,825 A | 3/1987 | Jellinek et al. | | 524/596 |
| 4,904,753 A | * | 2/1990 | Watts et al. | 528/137 |
| 5,043,175 A | 8/1991 | Bayley et al. | | 426/318 |
| 5,243,015 A | 9/1993 | Hutchings et al. | | 528/129 |
| 5,324,337 A | 6/1994 | Helbing | | 65/450 |
| 5,344,909 A | 9/1994 | Hutchings et al. | | 528/129 |
| 5,578,371 A | 11/1996 | Taylor et al. | | 428/288 |
| 5,952,440 A | * | 9/1999 | Walisser et al. | 525/504 |

FOREIGN PATENT DOCUMENTS

EP    0 190 468    8/1986

* cited by examiner

*Primary Examiner*—Terrel Morris
*Assistant Examiner*—John J. Guarriello
(74) *Attorney, Agent, or Firm*—Barnes & Thornburg

(57) ABSTRACT

The present invention relates to methods of preparing improved fiber glass compositions using an improved resin binder. The resin binder comprises an aqueous solution of a resole resin, a catalyst comprising an ammonia salt of an aryl sulfonic acid, and optional binder modifiers. It has been found that the use of ammonium aryl sulfonate salts in resin binder compositions, as in the present invention, provides an enhanced cure rate and also enables manufacture of a fiber glass composition exhibiting enhanced uncured storage properties, increased thermal stability, and reduced corrosiveness to metals.

14 Claims, No Drawings

FIBER GLASS BINDER COMPOSITIONS AND PROCESS THEREFOR

This application claims the benefit of provisional application Ser. No. 60/085,890 filed May 18, 1998.

FIELD OF THE INVENTION

The present invention relates to an improved fiber glass composition. More particularly the invention is directed to a fiber glass composition including an improved resin binder having an enhanced cure rate. The improved binder also enables manufacture of a fiber glass composition exhibiting enhanced uncured storage properties, increased thermal stability, and reduced corrosiveness to metals.

BACKGROUND AND SUMMARY OF THE INVENTION

Fiber glass compositions find significant use as acoustical or thermal insulation in a wide variety of commercial applications. Generally fiber glass compositions are prepared by applying a resin binder composition including a resole (phenol-formaldehyde) resin and a catalyst to hot glass fibers; the binder-coated glass fibers are collected in the form of a non-woven fiber glass blanket. The fiber glass blanket is thereafter compressed and heated to cure the binder composition either in an oven ("line cure") to form batts or boards or in a mold to form shaped fiber glass articles. During the heating step, the resin binder composition dispersed on the glass fibers polymerizes to form an infusible, cured resin solid that binds the glass fibers where they overlap to impart strength and resiliency to the fiber glass product. Molded fiber glass articles thus retain their molded, compressed shape after they are removed from the mold.

Fiber glass blankets, sometimes referred to as "molding stock," are often manufactured, stored in an uncured state as a compact roll and subsequently sold to off-site fiber glass manufacturing operations where they are used to manufacture molded fiber glass articles. When the rolled fiber glass blankets are unrolled after a period of storage, they often do not lie flat, and their surface exhibits a frayed or napped appearance. That condition is usually attributed to premature curing of the raw resin binder during blanket storage. Fiber glass blankets exhibiting such characteristics typically do not provide molded fiber glass articles having the physical properties, i.e. the flexural, tensile and compressive strengths exhibited by molded fiber glass articles prepared from fiber glass blankets immediately after their manufacture.

There has been significant research and development efforts directed to improving resin binder compositions useful in the manufacture of fiber glass articles. The present invention is based on the development and use of novel catalyzed resin binder compositions that not only enable enhanced storage life for uncured fiber glass blankets, but also exhibit longer "pot life" in the fiber glass blanket production line. Yet, surprisingly, the uncured catalyzed resin binder compositions of this invention also exhibit a demonstrably faster rate of heat-induced cure, and the cured binder compositions exhibit advantageous chemical/mechanical properties. Fiber glass products formed using such binders exhibit reduced corrosivity in standardized tests. Further, in preferred embodiments, the present binder compositions can be used in significantly reduced amounts (relative to the usage levels of state-of-the-art resin binders) in fiber glass blanket manufacture without substantial compromise of physical strength characteristics. Lower resin binder usage levels enables production of fiber glass articles with improved thermal stability.

The novel catalyzed resin binder composition in accordance with this invention is an aqueous solution of a resole (phenol-formaldehyde) resin and about 2 to about 10 parts per weight on a solids basis of a catalyst consisting essentially of a salt formed from ammonia and an aryl sulfonic acid. The binder optionally, but preferably, includes as well a compound selected from the group consisting of urea, melamine and dicyandiamide or combinations thereof. The resin binder composition is characterized by a cure rate which is about 10 to about 50% faster than a binder of identical resin composition, but with an equivalent amount of ammonium sulfate as an acid catalyst. The chemical/mechanical properties of the improved resin binder composition allow preparation of fiber glass compositions exhibiting advantage in many applications.

In one embodiment of the present invention, there is provided a process of preparing fiber glass blankets characterized by their improved storage stability as evidenced by the flexural, tensile and compressive strengths of molded fiber glass compositions formed by heating and compressing the blanket after a predetermined storage period. The storage stable fiber glass blanket is prepared using the improved aqueous resin binder composition comprising a resole resin and about 2 to about 10 parts per weight on a solids basis of a catalyst consisting essentially of a salt formed from ammonia and an aryl sulfonic acid. The glass fibers are coated with the resin binder composition, and the binder-coated glass fibers are collected in the form of a non-woven blanket including an effective amount (generally up to about 25% by weight) on a solids basis of the resin binder.

In high temperature applications, for example, pipe insulation for high temperature steam pipes, the cured resin binder composition in the fiber glass insulation can decompose exothermally resulting in high localized temperatures that can soften and/or melt the glass fibers and form voids in the insulating composition. The result is loss of insulating capacity. There is also provided in accordance with the present invention a fiber glass composition having enhanced thermal stability and a method of preparation thereof. Typically molded fiber glass articles are manufactured using a predetermined amount of a resole resin binder composition relative to the weight of fiber glass. In one embodiment of this invention fiber glass compositions are formed using less than the predetermined amount of the improved binder composition. The resulting fiber glass compositions having reduced binder content are compressed and heated to form fiber glass articles having enhanced thermal stability and without significant loss of structural strength.

Many fiber glass compositions are used as acoustical or thermal insulation in direct contact with steel or other metal surfaces. Components of the cured resin binder composition may leach out of the fiber glass insulation and promote corrosion of adjacent metal surfaces. Thus, in another related embodiment of the present invention there is provided a fiber glass composition characterized by low corrosiveness as assessed by either ASTM C665.98 §13.8 or ASTM C795-92 and a process for preparing such non-corrosive fiber glass compositions.

DETAILED DESCRIPTION OF THE INVENTION

The present invention is directed to improved fiber glass compositions and to methods of preparation of such compositions using an improved resin binder composition, including a resole resin, a catalyst comprising a salt of ammonia and an aryl sulfonic acid, and one or more resin binder modifiers selected from the group consisting of urea, melamine, and dicyandiamide. In preferred embodiments the catalyst for the resin binder composition consists essentially of an ammonium salt of an aryl sulfonic acid. It has been found that the use of ammonium aryl sulfonate salts in resin binder composition offers significant advantage, not only in the manufacture of the present fiber glass compositions but as well in the chemical and physical properties of the fiber glass products themselves.

Generally in the manufacture of the present fiber glass compositions an aqueous resin binder composition having about 10% to about 40%, more typically about 12% to about 35% solids is applied to hot glass fibers which are collected in the form of a non-woven blanket. The blanket is typically compressed and heat-cured either in a line oven or in a heated compression mold; or it is rolled and stored for later heat-cure processing. The amount of resin binder composition used in the manufacture of the fiber glass blankets depends significantly on the intended use of the fiber glass product. Thus the binder can constitute about 3 up to about 25% by weight on a solids basis of the uncured fiber glass blanket. More typically the amount of resin binder ranges from about 3% to about 20% by weight of the fiber glass blanket. Fiber glass blankets intended to be used in the manufacture of fiber glass batts can include as little as 3% resin binder. Fiber glass blankets intended for the manufacture of pipe insulation typically includes less than 10% by weight binder on a solids basis, more preferably less than about 8% by weight. Fiber glass compositions in accordance with this invention, including less than 8% by weight binder on a solids basis has been found to demonstrate exceptional thermal stability, particularly when the binder composition is modified to include up to 70%, more typically 20% to about 60%, of a binder modifier selected from the group consisting of urea, melamine, dicyandiamide and combinations thereof. The preferred binder compositions in accordance with this invention exhibit such good strength characteristics on cure that binder levels can be reduced from about 70 to about 90% of the binder levels commonly employed in the manufacture of fiber glass compositions without significant loss of structural/strength properties. The use of lower binder levels also enables higher temperature stability of the manufactured fiber glass products.

Fiber glass blankets manufactured in accordance with this invention, as mentioned above, are typically compressed and heat-cured either in a line oven to form batts or boards or in compression molds to form molded fiber glass constructs. Typically the fiber glass blankets are heated during that process to about 300° to about 500° F., more typically about 400° F., for a period of time sufficient to cure the binder component of the fiber glass blanket. It has been found that preferred embodiments of the present improved resin binder composition including a catalyst consisting essentially of a salt formed from ammonia and an aryl sulfonic acid are characterized by a cure rate which is about 10 to about 50% faster than art-recognized binders of identical resin composition, except for the use of an equal amount of ammonium sulfate as a catalyst. In manufacturing operations the faster resin binder cure rates translate into higher throughput and/or less capital investment in line oven equipment.

The resin binder composition of the present invention includes a resole resin, a catalyst and optional binder modifiers. The resole resin is a phenol-aldehyde (preferably formaldehyde) resin having a molar ratio of phenol to aldehyde of about 1:1.1 to about 1:5. Preferably the phenol to aldehyde ratio is from about 1:2 to about 1:3. The most preferred phenol to aldehyde ratio for the present invention is about 1:3. Resole resins are commercially available from numerous resin suppliers. One commercially available resin that can be used for formulating the present improved binder composition is a Georgia Pacific 2874 resin.

The phenol component of the resole resin can include a variety of substituted and unsubstituted phenolic compounds. The phenolic compounds are generally not substituted at the ortho and para positions on the aromatic ring with substituents that will interfere with polymerization with the aldehyde components. However, phenols substituted in these positions may be used in lesser quantities to control the molecular weight of the polymer by stopping the polymeric chain extension by a "capping" reaction. The phenol component may include phenolic compounds such as: phenol, alkyl substituted phenols, aryl substituted phenols, cycloalkyl substituted phenols, alkenyl-substituted phenols, alkoxy substituted phenols, and aryloxy substituted phenols. Specific examples of suitable phenols include: phenol, o-creosol, m-creosol, p-creosol, resorcinol, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-crotyl phenol, p-octyl phenol, 3,5-dicyclohexyl phenol, p-phenyl phenol, 3,5-dimethoxy phenol, 3,4,5-trimethoxy phenol, p-ethoxy phenol, p-butyloxy phenol, 3-methyl-4-methoxy phenol, p-phenoxy phenol, and bis-phenol.

The aldehyde component of the resole resin is preferably formaldehyde and can include so-called masked aldehydes or aldehyde equivalents such as acetals or hemiacetals. Specific examples of suitable aldehydes include: formaldehyde, acetaldehyde, propionaldehyde, butaraldehyde, furfuraldehyde, and benzaldehyde.

The catalyst component of the resole resin binder composition of this invention comprises an ammonia salt of an aryl sulfonic acid. The nature/structure of the sulfonic acid is not critical provided that it is soluble in the aqueous resin binder composition and provided its acid functionality is capable of catalyzing polymerization of the resole resin. The typical aryl sulfonic acids include benzene sulfonic acid, phenol sulfonic acid, ortho-, para- or meta-toluene sulfonic acid, mesitylenesulfonic acid, ethylbenzenesulfonic acid, xylenesulfonic acid, propylbenzenesulfonic acid, and butylbenzenesulfonic acid. Preferably the aryl sulfonic acid is either benzene sulfonic acid or toluene sulfonic acid or mixtures thereof.

The catalyst can be added to the binder neat or it can be prepared in situ as a stock solution for addition to the resole resin. The stock solution is prepared by neutralizing the aryl sulfonic acid with ammonia or an ammonium salt to produce an ammonium salt of the acid. Ammonium hydroxide, and ammonium carbonate are examples of typical ammonium salts although other ammonium salts may be used. The order of addition of the acid and the ammonium salt is not critical. In one preferred embodiment, the ammonium aryl sulfonate catalyst is prepared by adding a stoichiometric amount of an aqueous solution of ammonium hydroxide to an aqueous solution of the aryl sulfonic acid.

The catalyst is typically used in an amount ranging from about 3 to about 10 parts per hundred of the solid content in the resin binder composition. Preferably, the catalyst is present in an amount from about 5 to about 8 parts per hundred on a solids basis. The solids content is the amount of solid residue that remains after all volatile components of the binder composition are removed. The percentage of solids content in the binder is determined by placing about 1.0 gram of the binder composition in an aluminum dish and drying the composition to dryness in a circulating oven at 300° C. The weight of the dried composition is divided by the weight of the aqueous binder then multiplied by 100 to obtain the percentage of solids content in the binder.

In a preferred embodiment, the resole resin binder composition comprises an aqueous solution of a resole resin formulation having flow characteristics that enable it to flow to the intersections where the glass fibers overlap in the fiber glass blanket before it is dried. The resin binder composition of this invention exhibits good pH stability; the binder pH typically does not vary from the initial value more about 1 pH unit within a 24 hour period. Generally, the initial pH of the resin binder composition is adjusted to about 6 to about 10, more preferably about 7 to about 9.5, by the addition of aqueous ammonia.

The resin binder composition can be formulated to contain up to about 70% by weight on a solids basis of a binder modifier. Preferred binder modifiers are selected from the group consisting of urea, melamine, dicyandiamide and combinations. These modifiers impart thermal stability to the cured fiber glass product and they work to otherwise improve binder performance. Other modifiers include, for example, chain terminating phenols, glycols, polyester polyols, polyether polyols, polypropylene glycol, polyhydric alcohols alkyl phenols, lactams, polyamides, ureas, polyamines, hydroxy-containing acrylates, silanes, alkoxysilanes, and mixtures thereof.

Surfactants may also be added to the resin binder composition to help solubilize intermediates and products formed from the condensation reaction between the phenol, the aldehyde and other binder additives. In addition, surfactants or additives help disperse the condensation products and prevent agglomeration of these products to provide or maintain the binder as a homogeneous solution. Suitable surfactants include but are not limited to glycols, glycol ethers or esters, methoxylated alcohols, alkyl sulfonates and alkyl phosphonates.

Urea is typically added to the resin binder composition to act as a formaldehyde scavenger and a binder extender. Urea readily combines with the free aldehyde in the resin under mildly alkaline or neutral pH conditions. It is important to reduce the free aldehyde content because aldehyde emissions during the curing process or later from the cured fiber glass article are undesirable. The addition of urea to the present resin binder composition reduces aldehyde emissions, improves the efficiency of resin cure and ultimately reduces the cost of the resin binder composition.

The fiber glass blanket prepared according to the present invention may be compressed and stored prior to its use for manufacture of molded fiber glass compositions. For example, the fiber glass molding stock may be stored in the form of a tightly rolled blanket for several months. The molded fiber glass composition prepared from the storage stable fiber glass molding stock exhibits structural characteristics comparable to that exhibited by molded fiber glass compositions prepared from the fiber glass molding stock before storage. Flexural, tensile, and compressive strengths of the molded fiber glass articles are evaluated according to ASTM standard testing protocol D 638-91 "Standard Text Methods for Tensile Properties of Plastics" and D 790-92 "Standard Test Methods for Flexural Properties of Unreinforced and Reinforced Plastics in Electrical Insulating Materials," and C 165-95 "Standard Test Methods for Measuring Compressive Properties of Thermal Insulations," respectively.

Thus, one embodiment of the present invention is a process for preparing a fiber glass blanket comprising glass fibers and a resin binder composition, wherein said fiber glass blanket is characterized by improved storage stability evidenced by the strength of a molded fiber glass composition formed by heating and compressing said blanket after a pre-determined storage period. The method comprises the steps of forming an improved aqueous resin binder composition comprising a resole resin and about 2 to about 10 parts by weight on a solids basis of a catalyst comprising a salt formed from ammonia and an aryl sulfonic acid, coating glass fibers with said improved resin binder compositions, and collecting the coated glass fibers to provide the fiber glass composition in the form of a non-woven blanket containing up to about 25% by weight of the resin binder composition on a solids basis. The process can further include the step of compressing the fiber glass blanket for storage. Preferably the improved resin binder composition comprises about 3 to about 8% by weight on a solids basis of a catalyst consisting essentially of a salt formed from ammonia and an aryl sulfonic acid. The product, a storage stable fiber glass blanket, can be stored for at least two months prior to its use in the manufacture of a molded fiberglass composition without significant reduction in the strength of the molded composition compared to that exhibited by molded fiber glass compositions prepared from the fiber glass blanket before storage.

Thermal stability of molded fiber glass articles in accordance with this invention have been evaluated according to the procedure outlined in the ASTM C411-97. "Standard Test method for Hot-Surface Performance of High-Temperature Thermal Insulation." A fiber glass article formed in the shape of pipe insulation for a 3 inch diameter pipe is placed over a 3" diameter metal pipe completely encircling the pipe. The pipe is heated by an electrical heat source located inside the pipe. The rate of heating and final temperature are carefully controlled. The temperature of the fiber glass pipe insulation is measured proximate to the pipe surface, in the middle of the fiber glass insulation and proximate to the exterior surface of the fiber glass insulation. The pipe is maintained at the desired temperature for 96 hours. The fiber glass pipe insulation is cooled and inspected for voids that indicate binder decomposition. Preferred embodiments of the present fiber glass compositions had been found to exhibit exceptional thermal stability.

Thus, there is provided in accordance with one embodiment of the present invention a molded fiber glass composition comprising glass fibers and less than 8% by weight on a solids basis of a heat-cured binder composition. The binder composition comprises a resin composition including a resole resin and a catalyst comprising a salt formed from ammonia and an aryl sulfonic acid. The molded fiber glass composition is characterized by thermal stability up to at least 850° F. in ASTM C411-97. In another embodiment the molded fiber glass composition of this invention exhibits thermal stability up to at least 1000° F. in ASTM C411-97. The binder composition used in manufacture of such thermally stable molded fiber glass compositions preferably include about 10% to about 70%, more preferably about 20% to about 60% by weight, on a solids basis of a compound selected from the group consisting of urea, melamine, dicyandiamide, and combinations thereof.

In a related process embodiment of this invention there is provided a process for manufacturing a molded fiber glass composition characterized by reduced binder content and having enhanced thermal stability without loss of other physical properties. The process comprises the steps of preparing an improved resole resin binder composition including a catalyst comprising a salt formed from ammonia and an aryl sulfonic acid, forming a fiber glass blanket from glass fibers coated with the improved resole resin binder composition in less than the amount normally used in preparing such compositions and compressing and heating the resulting blanket to cure the resin binder composition and form a molded fiber glass composition exhibiting good thermal stability. Molded fiber glass compositions can be prepared in accordance with that process using about 70% to about 90% of the normal binder amount. In a preferred embodiment of a thermally stable fiber glass composition of this invention, the amount of the improved resin composition in the fiber glass blanket is about 6% to about 7% by weight of the fiber glass composition on a solids basis.

Molded fiber glass compositions according to the present invention exhibit reduced metal corrosivity as evidenced in tests procedure described in ASTM C665-95 §13.8. One set of five small steel test coupons are individually sandwiched between pieces of fiber glass insulation. A second set of five steel test coupons are individually sandwiched between sterile, de-oiled cotton as controls. Both sets of test plates are exposed to 95% humidity at 120° F. for 96 hours in a humidity test chamber. Both sets of test plates are then visibly examined for any corrosion. The steel coupons that were held in contact with the present fiber glass composition exhibited less corrosion than the surface of the steel plates that were held in contact with de-oiled cotton.

Thus, another embodiment of this invention is a non-corrosive fiber glass composition comprising glass fibers and the improved binder composition of this invention. The fiber glass composition produces less corrosion on a steel coupon than de-oiled sterile cotton when tested under the conditions of ASTM C665-98, §13.8 and no stress corrosion cracking under the conditions of ASTM C 795-92 in contact with austenitic stainless steel.

EXAMPLES

The following examples are set forth to illustrate the principles and practices of the present invention to one skilled in the art. They are not intended to be restrictive but merely to be illustrative of the invention. Unless otherwise stated, all parts, percentages and ratios are on a weight basis. All water was passed through a zeolite filled column to remove calcium and magnesium salts from the water. Water dilutability measurements are on a volume to volume basis, water to binder. Solids content for the following examples were determined by placing 1 gram of resin mixture in a pan and drying the resin in a circulating oven for 30 minutes at 300° F. The dry residue is weighed to determine the weight of solids. The percentage of solids content was determined by multiplying the ratio of the weight of dried, cured resin to the weight of the resin by 100 to obtain the percentage of solids content in the binder.

The amount of cured binder in the fiber glass article was determined by the loss on ignition method (LOI). A pre-weighed sample of the fiber glass article was ignited to burn cured binder from the fiber glass article leaving the binder free glass fibers. The resulting glass fibers were weighed, and the ratio of the weight of the burned fiber glass product to the initial weight of the fiber glass article was multiplied by 100 to obtain the percentage of cured binder in the fiber glass product.

Preparation 1
Preparation of Ammonium Toluene Sulfonate Catalyst

A 500 gallon tank containing 211 gallons of purified water was charged with 0.07 lbs. of sodium lauryl sulfate, and the aqueous solution was agitated to ensure homogeneity. A 66% aqueous solution of toluene sulfonic acid monohydrate, 500 lbs., was added followed by the addition of 5 gallons of purified water. Finally, an aqueous solution of ammonium hydroxide (17.5 gallons, 29–30% $NH_4OH$ by weight) was added. This catalyst solution had a density of 8.65 lb/gallon and a solids content of about 15±1%.

Preparation 2
Phenol-Formaldehyde-Urea Premix

Phenol and formaldehyde in a phenol-formaldehyde molar ratio of 1:3 were reacted together to obtain a resole resin having about 1% free phenol and 7.5% free formaldehyde. Sufficient urea and water were added to yield an aqueous resole resin solution mixture having about 2% urea and about 51% solids content. Phenol-formaldehyde resin (6233 pounds) and an aqueous solution of urea (3422 pounds, 40% by weight of urea) was added while the resulting solution was stirred to ensure homogeneous mixing. The temperature of the resulting solution was maintained from about 50° F. to about 70° F. This premix solution had a density of about 9.69 lb/gallon and a solids content of about 47.1±2%.

Example 1A
Preparation of a Resole Resin Binder Composition Containing 30% Solids Including an Ammonium p-Toluene Sulfonate Catalyst To a stirred container 161.2 grams phenol-formaldehyde-urea premix (Preparation 2) was added. About two minutes after the premix was added, 0.80 grams of an aqueous solution of ammonium hydroxide solution (28% $NH_4OH$ by weight) was added. The ammonium hydroxide solution was followed in turn by the addition of 84.0 grams of zeolite softened water; 1.9 grams of p-toluene sulfonic acid monohydrate; and 0.15 grams of α-aminopropyl triethoxy silane (sold by OSi Specialities Inc. under the trade name Silquest A-1101, 90% $(H_2NCH_2CH_2CH_2)Si(OCH_2CH_3)_3$ by weight in ethanol). The final temperature of the mixture was 69° F., and it had a pH of 7.9. The dilutability of this resin composition was greater than 50:1 v/v distilled water to resin without any observable haziness in the dilute aqueous solution. After storing this resin mixture at about 70° F. for 24.5 hours, the physical properties were again determined. The resin had a pH of 7.8 and a dilutability of greater than 50:1, v/v water to resin without any observable haziness in the dilute aqueous solution.

Comparative Example 1B
Preparation of a Resole Resin Binder Composition Containing 30% Solids Including a Ammonium Sulfate Catalyst When a resole resin binder composition containing 30% solids was prepared according to the above procedure except that the ammonium p-toluene sulfonate that was replaced with ammonium sulfate on a gram per gram basis, the pH of the resulting solution dropped from 8.0 to 5.9 and the dilutability of the solution dropped from 50:1 to 7:1 within 24 hours after the solution was prepared.

Example 2A
Molded Fiber Glass Boards Using a Resole Resin Binder Composition Containing 35% Solids Including an Ammonium p-Toluene Sulfonate Catalyst A phenol-formaldehyde-urea premix, 97.8 kg, prepared according to the procedure described in Preparation 2 was added to a mixing tank. The following components were added to the premix in sequence: an aqueous solution of ammonium hydroxide (483 g, 29–30% NH$_4$OH by weight); 1.15 kg of solid p-toluene sulfonic acid monohydrate; and 92 g of α-aminopropyl triethoxy silane (sold by OSi Specialities Inc. under the trade name Silquest A-1101, 90% (H$_2$NCH$_2$CH$_2$CH$_2$)Si(OCH$_2$CH$_3$)$_3$ by weight in ethanol). Finally, 9.4 gal. of water was added to provide a resin binder composition containing 35% solids. The solids content contained 97.4 parts per hundred of the resole resin, 2.4 parts per hundred of p-toluene sulfonic acid and 0.2 parts per hundred of Silquest A1101.

This resole resin binder composition was used to prepare a fiber glass blanket. Fifteen gallons of an aqueous mixture containing Nigrosine dye, 1 lb, and 0.4 gallons of an aqueous dispersion of carbon black (sold under the trade name of Ajack Black 35®) was added to the resole resin binder to form a black binder composition that was sprayed on to the hot glass fibers. The black binder coated glass fibers were collected in a non-woven blanket form, and dried. The resulting fiber glass blanket was collected, rolled and stored in a warehouse.

After 51 days in storage the black fiber glass blanket was retrieved from storage and pressed in a mold at 400° F. to produce two sets of black fiber glass boards that were either ¼" or 1" thick. The black fiber glass boards had a LOI (loss on ignition) of 15.6%, a moisture content of 5.2%.

Comparative Example 2B
Molded Fiber Glass Boards Using a Resole Resin Binder Composition Containing 35% Solids Including an Ammonium Sulfate Catalyst Fiber glass boards were prepared for comparison purposes using a resin binder composition containing 35% solids according to the above procedure except ammonium sulfate was substituted for the ammonium p-toluene sulfate on a gram per gram basis. The resulting resin binder had a solids content of 97.4 parts per hundred of resole resin, 2.4 parts per hundred of ammonium sulfate and 0.2 parts per hundred of A1101. This resin binder composition was used to prepare black fiber glass molding stock as descried above. The molding stock was stored for 57 days, then used to prepare ¼" and 1" thick black fiber glass boards. These black fiber glass boards had an LOI of 16.5%.

Tensile and Flexural tests are performed on the ¼" thick black fiber glass boards according to ASTM standard testing protocols D 638-91; "Standard Test Method for Tensile Properties of Plastics" and D 790-92; "Standard Test Methods for Flexural Properties of Unreinforced and Reinforced Plastics and Electrical Insulating Materials," respectively. Compression tests are performed on the 1" thick black boards according to ASTM standard test protocol C 165-95; "Standard Test Method for Measuring Compressive Properties of Thermal Insulations". Preliminary tensile and flexural on ¼ inch thick boards and compression strength tests on one-inch thick boards press-cured from molding stock containing Example 2A binder and from molding stock containing Comparative Example 2B binder indicate that the p-toluene sulfonate catalyzed binder boards are stronger than the ammonium sulfate catalyzed binder board.

Examples 3–13

Additional examples of binder compositions in accordance with this invention are illustrated in the following Table. They are typically prepared by blending (with mild agitation) the premix of Preparation 2 or a commercially available resole resin, aqueous urea, softened water, catalyst as an aqueous solution, and other resin binder modifiers. Concentrated aqueous ammonia is used to establish the desired pH. Such binder compositions either exhibit or are expected to exhibit good pH stability and enhanced cure rates. They can be used in the manufacture of a wide variety of molded fiber glass products.

| Example No. | Solids % | Resole Resin | Urea | ABSA+ | ATSA* | Silane | Sulfonated Melamine++ | DCDA@ | pH |
|---|---|---|---|---|---|---|---|---|---|
| 3 | 12 | 70.7 | 24.8 | | 4.25 | 0.34 | | | 8.7 |
| 4 | 14 | 55.4 | 30.2 | | 4.45 | 0.40 | 9.55 | | 9.2 |
| 5 | 23 | 42.7 | 42.9 | | 3.75 | 0.37 | 10.3 | | 9.5 |
| 6 | 22 | 75.2 | 20.3 | | 3.98 | 0.52 | | | 8.5 |
| 7 | 29 | 50.3 | 35.3 | 4.58 | | 0.32 | | 9.5 | 8.5 |
| 8 | 12 | 68.9 | 24.2 | | 6.65 | 0.23 | | | 9.0 |
| 9 | 10 | 62.4 | 23.6 | 3.4 | | 0.30 | 4.5 | 5.8 | 8.8 |
| 10 | 25 | 68.1 | 27.2 | | 4.25 | 0.45 | | | 7.2 |
| 11 | 16 | 50.6 | 35.6 | 7.5 | | 0.30 | 6.0 | | 7.8 |
| 12 | 40 | 65.3 | 28.0 | | 6.42 | 0.28 | | | 8.6 |
| 13 | 20 | 38.2 | 47.2 | | 4.1 | 0.32 | 10.18 | | 9.8 |

+ammonium benzene sulfonic acid
*ammonium toluene sulfonic acid
@dicyandiamide
++Georgia Pacific 482T23

We claim:
1. In a process for manufacturing a molded fiber glass composition formed by heating and compressing a fiber glass blanket prepared by first forming a catalyzed aqueous binder composition comprising a resole resin and a catalyst, coating glass fibers with an amount of said binder composition, and collecting said coated glass fibers as a non-woven fiber glass blanket having about 3 to about 25% by weight resin binder on a solids basis, the improvement in said process for producing a molded fiber glass composition having enhanced thermal stability without loss of structural strength or flexibility, said improved process further comprising the steps of
preparing the resole resin binder composition to include about 2 to about 10 parts per hundred on a solids basis a catalyst comprising a salt formed from ammonia and an aryl sulfonic acid, and
reducing the amount of resin binder composition used to coat the glass fibers forming the fiber glass blanket.

2. The process of claim 1 wherein the amount of the resin binder composition in the fiber glass blanket is reduced by about 10% to about 30%.

3. The process of claim 1 wherein the aryl sulfonic acid used as the catalyst in the resin binder composition is toluene sulfonic acid.

4. The process of claim 3 wherein the amount of the resin binder is about 6% to about 7% by weight of the molded fiber glass composition on a solids basis.

5. The process of claim 4 wherein the resin binder composition further comprises up to about 70% by weight on a solids basis of a compound selected from a group consisting of urea, melamine, dicyandiamide and combinations thereof.

6. The process of claim 1 wherein the resin binder composition further comprises up to about 70% by weight on a solids basis of a compound selected from a group consisting of urea, melamine, dicyandiamide and combinations thereof.

7. A process for preparing a fiber glass blanket comprising glass fibers and a resin binder composition, said fiber glass blanket characterized by improved storage stability evidenced by the strength of a molded fiber glass composition formed by heating and compressing said blanket after a storage period, said process comprising the steps of forming an aqueous resin binder composition comprising a resole resin and about 2 to about 10 parts by weight on a solids basis of a catalyst comprising a salt formed from ammonia and an aryl sulfonic acid, coating glass fibers with said resin binder composition, and collecting the coated glass fibers to provide the fiber glass composition in the form of a non-woven blanket containing about 3 to about 25% by weight of the resin binder composition on a solids basis.

8. The process of claim 7 further comprising the step of compressing the blanket for storage.

9. The process of claim 7 wherein the aryl sulfonic acid is toluene sulfonic acid.

10. The process of claim 7 wherein the resin binder composition comprises from about 3% to about 8% by weight on a solids basis of a catalyst consisting essentially of a salt formed from ammonia and an aryl sulfonic acid.

11. The process for preparing a fiber glass composition characterized by exceptionally low corrosiveness as assessed by ASTM C665-98 Section 13.8 or ASTM C795-92, said composition comprising glass fibers and a resin binder composition, said process comprising the steps of
preparing an aqueous resin binder composition having about 10% to about 40% by weight solids comprising a resole resin and a catalyst comprising a salt formed from ammonia and an aryl sulfonic acid, said catalyst forming about 2 to about 10% by weight of the solids in the resin binder composition,
coating glass fibers with the resin binder composition and collecting the coated glass fibers in the form of a non-woven blanket having about 3 to about 25% by weight binder composition on a solids basis, and
heating the fiber glass blanket to cure the resin binder component of the fiber glass blanket.

12. The process of claim 11 further comprising the step of compressing a fiber glass blanket during the step of heating the blanket to form a molded fiber glass composition.

13. In a process for manufacturing a fiber glass composition wherein glass fibers are coated with a catalyst-containing aqueous resin binder composition comprising a resole resin, collecting said coated fibers as a non-woven fiber glass blanket, and heating the blanket for a period of time sufficient to cure the resin binder component of said blanket, the improvement in said process comprising the steps of
preparing the resin binder composition to include about 2 to about 10 parts per hundred by weight of a catalyst comprising a salt formed from ammonia and aryl sulfonic acid, said resin binder composition having about 10% to about 40% by weight solids, and reducing the period of time for heating the blanket by about 10 to about 50% to cure the resin binder component of the fiber glass blanket.

14. The process of claim 13 wherein the aryl sulfonic acid used to form the catalyst in the resin binder composition is toluene sulfonic acid.

* * * * *